(12) United States Patent
Samways

(10) Patent No.: US 6,424,067 B1
(45) Date of Patent: *Jul. 23, 2002

(54) CENTRIFUGAL SEPARATOR

(75) Inventor: Andrew L Samways, Dorchester (GB)

(73) Assignee: Federal-Mogul Engineering Limited (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/367,689

(22) PCT Filed: Feb. 11, 1998

(86) PCT No.: PCT/GB98/00427
§ 371 (c)(1),
(2), (4) Date: Aug. 19, 1999

(87) PCT Pub. No.: WO98/36845
PCT Pub. Date: Aug. 27, 1998

(30) Foreign Application Priority Data

Feb. 21, 1997 (GB) .............................. 9703685

(51) Int. Cl.[7] .......................... H02K 7/09; B04B 9/00; B04B 9/14
(52) U.S. Cl. ......................... 310/90.5; 494/46; 494/82; 494/83
(58) Field of Search ..................... 310/90.5, 51; 494/1, 494/8, 43, 46, 63, 65, 67, 82, 83; 384/193; 68/23.1; 210/144

(56) References Cited

U.S. PATENT DOCUMENTS

| | | | | |
|---|---|---|---|---|
| 3,216,655 A | * | 11/1965 | Wind et al. | 310/90.5 |
| 3,731,984 A | * | 5/1973 | Habermann | 310/90.5 |
| 3,762,633 A | * | 10/1973 | Ishii | 233/23 R |
| 3,856,200 A | * | 12/1974 | Lieb | 233/1 C |
| 3,860,300 A | * | 1/1975 | Lyman | 310/90.5 |
| 3,909,082 A | * | 9/1975 | Ishikawa et al. | 308/10 |
| 4,147,396 A | | 4/1979 | Lyman | 308/10 |
| 4,363,525 A | | 12/1982 | Poubeau | 308/10 |
| 4,920,291 A | * | 4/1990 | McSparran | 310/90.5 |
| 5,030,361 A | * | 7/1991 | Ishida et al. | 210/772 |
| 5,166,566 A | | 11/1992 | Bernhardt | 310/90.5 |
| 5,177,387 A | * | 1/1993 | McMichael et al. | 310/90.5 |
| 5,227,066 A | * | 7/1993 | Ishida et al. | 210/360.1 |
| 5,406,157 A | * | 4/1995 | New | 310/90.5 |
| 5,481,146 A | * | 1/1996 | Davey | 310/90.5 |
| 5,495,221 A | * | 2/1996 | Post | 310/90.5 |
| 5,801,469 A | * | 9/1998 | Takahata et al. | 310/90.5 |

FOREIGN PATENT DOCUMENTS

| | | |
|---|---|---|
| DE | 21 39 614 | 5/1973 |
| DE | 24 04 217 | 6/1978 |
| EP | 0 254 356 | 1/1988 |
| EP | 0 606 578 | 7/1994 |
| EP | 0 644 346 | 3/1995 |
| EP | 0 693 630 | 1/1996 |
| GB | 1 302 044 | 1/1973 |

* cited by examiner

Primary Examiner—Nestor Ramirez
Assistant Examiner—Dang Dinh Le
(74) Attorney, Agent, or Firm—Nixon & Vanderhye P.C.

(57) ABSTRACT

A centrifugal separator comprises a housing through which extends a spindle on which is mounted a centrifuge rotor. The rotor is mounted on journal bearing bushes that are lubricated by the liquid supplied at pressure to the rotor and the weight of the liquid-filled rotor is carried by magnetic repulsion thrust bearing comprising permanent magnets secured one each to the housing and rotor. The spaced magnets run without contact noise and frictional losses, improving rotational speed available from the supply pressure, and lateral (radial) instability that is inherent between repelling magnets and normally disliked puts a radial bias on the journal bearings which may result in quieter running by inhibiting vibration, particularly when the journal bushes are starved of liquid supply during wind-down. Alternatively or additionally, supply pressure induced lift of the rotor may be borne by a magnetic repulsion thrust bearing. The magnets may be permanent and/or electromagnets.

25 Claims, 6 Drawing Sheets

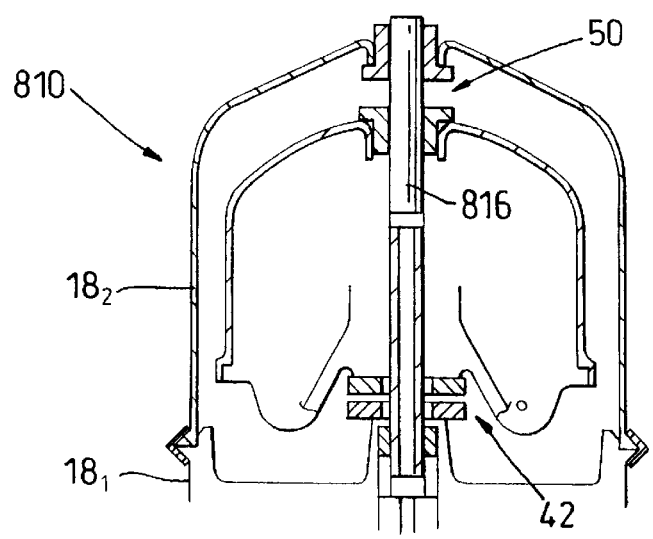
*Fig. 8(a)*
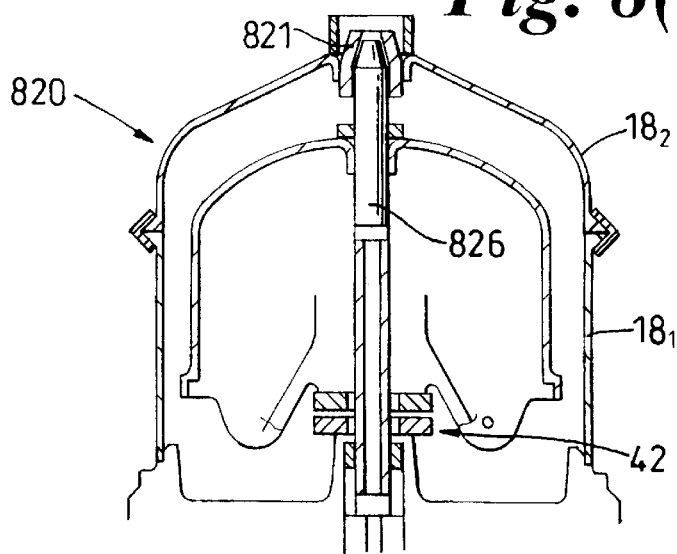
*Fig. 8(b)*
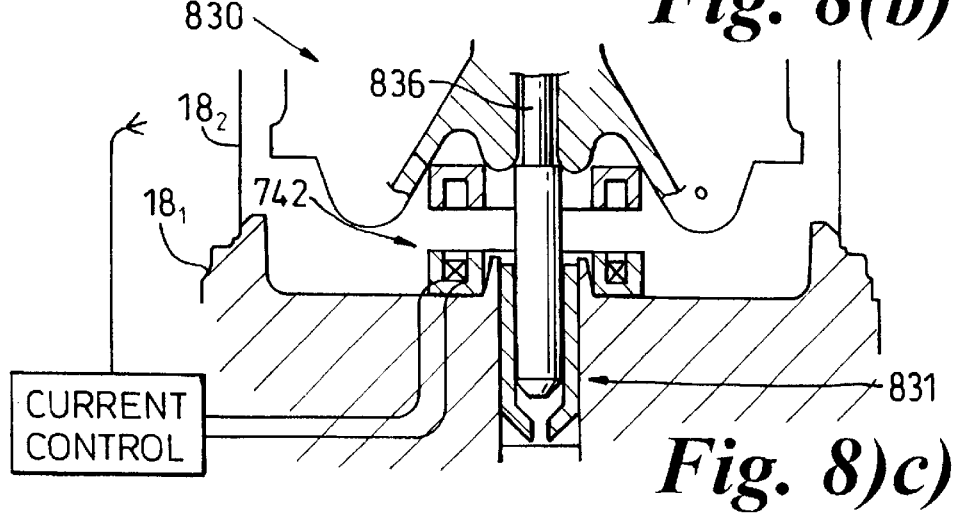
*Fig. 8)c)*

CENTRIFUGAL SEPARATOR

BACKGROUND OF THE INVENTION

This invention relates to centrifugal separators of the liquid powered kind for separating particulate contaminants from a liquid, such as a vehicle engine lubricant, within a containment rotor to which contaminated liquid is supplied at elevated pressure.

SUMMARY OF THE INVENTION

Liquid-powered centrifugal separator, are well known for separating fluids of different densities or for separating particulate matter from liquids and have long been used in lubrication systems for engines and analogous items of vehicles. The common principle of operation is that a housing contains a rotor which is supported therein to spin at high speed about a substantially vertical axis. The rotor comprises a container to which liquid is supplied at elevated pressure along the axis of rotation and is ejected from tangentially directed reaction jet nozzles into the housing from which it drains to the engine sump. Contaminated liquid lubricant is also supplied to the rotor to pass therethrough and, in doing so, denser contaminant materials are separated therefrom centrifugally and retained in the rotor. The drive liquid may comprise the contaminated liquid in a so-called self-powered centrifugal separator of the type described in, for example, GB-A-735658, GB-A-757538, GB-A-2160796, or GB-A-2383194, or it may be separate liquid as described in GB-A-2297499.

Notwithstanding the origin of the rotor drive liquid, the energy lost by the ejected liquid effects rotation of the rotor about the axis at a speed fast enough for the contaminated liquidcirculating in, and passing through, the rotor to deposit solid contaminants on surfaces that are spaced radially outwardly of the axis and face radially inwardly towards the axis. For efficient separation, and to ensure that separated contaminants do not interfere with the reaction jet nozzles, the rotor container may be provided with a radially inwardly extending partition wall that effectively divides the rotor into a separation chamber, in which the solids collect, and an outflow chamber, to which the cleaned liquid passes by way of a transfer aperture cited near the rotation axis. It is common in modem designs, such as, EP 0193000 and GB 2283694, for this partition wall to extend both radially and axially as what is sometimes referred to as a separation cone, which better holds solids and liquid-containing sludge within the separation chamber if the rotation axis is tilted from the vertical.

There are several criteria associated with successful operation. In particular, liquid supplied to the rotor to drive it has to be available at a significant pressure if the energy lost by its passage through the reaction jet nozzles is to be sufficient to rotate the rotor fast enough to effect centrifugal separation of said contaminated particles. Also, the rotor has to be supported within the housing enclosure by bearing means permitting its rotation and therefore the efficiency of rotation, and thus of separation, depends upon inefficiencies and losses within the bearing means. Furthermore, there is a tendency in certain circumstances for the rotating rotor to give rise to vibration, particularly as noise, that is transmitted to the housing by way of the bearing means, which vibration not only represents an energy loss detracting from rotation efficiency but also causes disturbance to the comfort of users of the vehicle. The problems of vibration is most acute when the spinning rotor winds down after the supply liquid pressure ceases, as discussed further below, and has been discussed in GB-A-2308557, the contents of which are incorporated by reference.

Conventionally the rotor is mounted by way of axle means in the form of a static spindle that is fixed with respect to the housing and relative to which the rotor rotates, or in the form of a spindle that is fixed to, and rotatable with, the rotor relative to the housing, and for convenience and clarity within this specification, such a rotatable spindle is referred to as a 'shaft' that extends from the ends of the rotor.

It will be appreciated that the above described static spindle and rotatable shaft may each be formed extending completely through the rotor or as short stubs extending from the housing and/or rotor as appropriate and the terms 'axle means', 'spindle' and 'shaft' is intended to incorporate such variants.

Notwithstanding the form taken by the axle means, the centrifuge rotor is usually mounted for rotation by bearings comprising plain, parallel bushes carried at each end of the rotor and surrounding the vertically extending axle means to form journal bearings. The bushes are a clearance fit on the axle means to permit unimpeded rotation and the gap between each bush and axle means is exposed to the lubricant supplied to the rotor such that some lubricant escapes along the gap and with the rotation creates a hydrodynamic film that provides easy rotation and some radial stiffness.

Mounting of the rotor by way of plain journal bearing bushes for rotation about a vertical axis provides no axial support per se for the axially directed load exerted on the rotor during operation. Whereas a limited degree of axial displacement is appropriate to facilitate free rotation, there is provided thrust bearing means to support an axially directed load on the rotor during operation, and possibly also displacement stop means operable to limit axial displacement in the axial direction opposite to that accommodated by the thrust bearing means, which displacement stop means may, of course, take the form of a supplementary thrust bearing to support the rotor in specific circumstances with minimal energy loss.

Conventionally such thrust bearing means and supplementary thrust bearing means is provided by a radially extending flanged end to one of the journal bushes and a facing surface fixed with respect to the housing, whereby the pressurised lubricant that provides lubrication and radial stiffness to the journal bearings also provides lubrication to the thrust bearing means.

In its simplest form the thrust bearing means is disposed between the rotor to support the axial load due to the combined weight of the rotor structure and the liquid lubricant filling it, including possibly an effective increase in such loading that comes from externally applied acceleration or shock forces. Such thrust bearing means is for convenience herein referred to as 'weight' thrust bearing means.

It will be appreciated that the axial loading placed on such weight thrust bearing means by the filled rotor may be several kilograms and is much greater than loading on the journal bearings, giving potential for excessive energy loss in, and even wear of, the thrust bearing means. The problems of axial loading due to rotor weight has been addressed by effecting so-called pressure-induced lift whereby the journal bushes exposed to drive liquid supply pressure are of different wall thicknesses so that the liquid pressure acts on the ends of the bushes and exerts a lifting force on the rotor to counter its weight. In centrifrugal separators that are of heavyweight construction and wherein the rotors are heavy and/or contain a large volume of liquid lubricant, such pressure induced lift as is feasible may only serve to reduce the effective axial load on the weight thrust bearing. In separators employing smaller, lighter rotors the degree of lift achievable may be such that it can completely overcome the weight of the filled rotor and the main thrust bearing means may be sited above the rotor whereby, in normal operation, an axial load on the rotor that is of lesser magnitude than the weight of the filled rotor bears upwardly on the thrust bearing means. Such style of thrust bearing means may be referred to for convenience as 'pressure lift' thrust bearing means. Clearly in the absence of adequate drive liquid supply pressure the rotor will be subjected to an overall downwardly directed loading and will tend to downward displacement. Accordingly, the provision of displacement stop means (conveniently below the rotor) is appropriate, possibly as supplementary thrust bearing means.

In addition to the load carrying capacity of the thrust bearing means being dependant upon drive liquid supply pressure, the radial stiffness of the journal bearings is also sensitive to such pressure and various external or out-of-balance forces acting on the rotor can result is disruption of the hydrodynamic film and contact between the relatively moving parts, which is a source of energy loss, wear and vibration/noise. As mentioned above, this is particularly troublesome when the lubricant supply ceases and the rotor winds down to rest. Also the absence of a replenished lubricant film between component parts of the thrust or supplementary thrust bearing permits physical abutment of the relatively rotating parts that can further be a source of vibration/noise during a prolonged wind-down interval.

It is an object of the present invention to provide a centrifugal separator which is capable of smaller bearing losses than hitherto in normal operation, and furthermore is capable of providing reduced levels of noise and vibration in normal operation and/or on wind down.

According to the present inventions a centrifugal separator comprises a housing enclosure, an axis extending through the housing enclosure in an operationally substantially vertical orientation, a rotor arranged to receive a liquid at elevated pressure and rotatable about the axis in reaction to ejection of the liquid therefrom substantially tangentially, journal bearing means to facilitate said rotation of the rotor about the axis and thrust bearing means to support the rotor in respect of displacement along the direction of the axis, the thrust bearing means comprising at least one magnetic repulsion thrust bearing operable to support by magnetic repulsion between two magnetic elements thereof at least part of the load created by the operatively rotating rotor in a direction along the axis.

The magnetic repulsion thrust bearing may comprise a 'weight' thrust bearing to support the weight of the liquid-filled rotor and/or a 'lift' bearing to limit upward displacement of the liquid filled rotor due to drive liquid supply pressure in normal operation. Furthermore, it may comprise axial displacement stop means to limit displacement of an empty or emptying rotor acted on by a magnetic repulsion thrust bearing.

Embodiments of the invention will now be described by way of example with reference to the accompanying drawings.

BRIEF DESCRIPTION OF THE DRAWINGS

FIGS. 8(a), 8(b) and 8(c) are schematic sectional elevations of sixth, seventh and eighth embodiments respectively of centrifugal separator in accordance with the present invention, corresponding functionally to FIGS. 1, 4 and 7 respectively but each having the axle means formed by a rotatable shaft fixed with respect to the rotor and mounted for rotation within journal bushes fixed with respect to the housing.

DETAILED DESCRIPTION OF THE INVENTION

Figure 1:
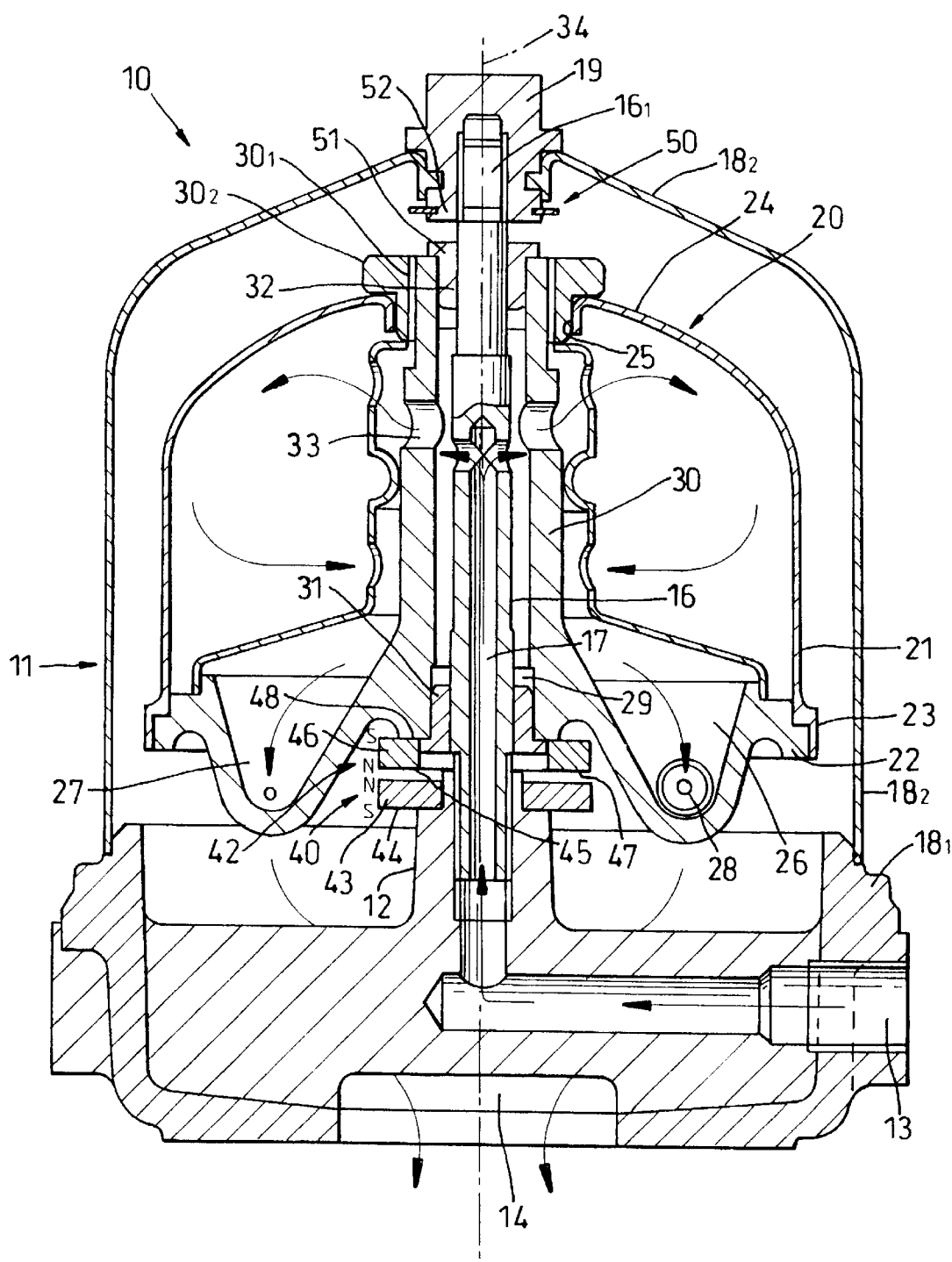
FIG 1 is a sectional elevation through a first embodiment of self-powered centrifugal separator in accordance with the present invention having a stationary spindle axle means on which the rotor in mounted for rotation and weight thrust bearing means formed by a magnetic repulsion thrust bearing that has one annular magnetic element fixed with respect to the housing and surrounding the rotation axis and a second annular magnetic element fixed to the base of the rotor to suspend the rotor by magnetic repulsion force between the magnetic elements.
Figure 2:
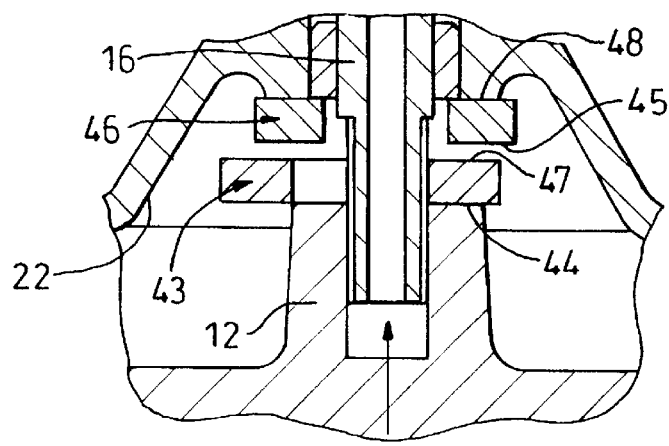
FIG. 2 is a sectional elevation, of a part of the separator of FIG. 1 comprising the magnetic repulsion thrust bearing, in which the stationary magnetic element is radially offset with respect to the axially concentric rotatable magnetic element in order to effect radial loading on the adjacent journal bearing in a predetermined direction.

Referring to FIGS. 1 and 2, a self-powered centrifugal separator arrangement for a vehicle engine is indicated generally at 10. The separator is employed in conjunction with a full flow filter (not shown) in maintaining the engine lubricant free of potentially damaging contaminants. Lubricant is pumped around the engine by a pump (not shown) whose delivery pressure is regulated but also is, to a limited extent, dependent upon engine speed and lubricant temperature.

The separator arrangement 10 comprises a housing 11 in the form of a support structure 12 coupled to the engine to receive pumped lubricant by way of supply duct 13 and return it to the sump by way of drain duct 14, thereby by-passing the engine components which use the pumped lubricant. The support structure 12 has fixed thereto a substantially vertically extending axle means 16 in the form of a spindle which has a passage 17 extending at least part way along and coupled to the supply duct 13 at its lower end. The housing is in vertically separable parts 18, and 182 and the upper end of the spindle 16, is secured to, and secures, a housing part 182 releasably sealed to the part 18, by means of nut 19.

A rotor 20 is mounted within the housing for rotation about the spindle 16. The rotor is substantially conventional in comprising a container formed from components 21 and 22 joined at a seam 23. The component 21 has a peripheral wall 24 which extends radially inwardly at one end of the rotor to an aperture 25. The component 22 forms a substantially radially extending base in which are formed recesses 26, 27 containing a pair of tangentially directed jet reaction nozzles, one only of which is visible at 28, the base component being apertured at 29 in line with aperture 25 on the longitudinal axis of the rotor.

A hollow tubular member 30, conveniently but not necessarily, integral with the base member 22 extends from the aperture 29 to and through the axially spaced aperture 29 and is externally threaded at its upper end 30, to receive a clamping nut 302 which retains the component 21 by means of its end wall and applies axially sealing pressure to seam 23. The member 30 acts as a spacer for the end walls of the rotor and a receptacle for plain journal bearing bushes 31 and 32 which support the rotor for rotation about spindle 16, the longitudinal axis of the rotor therefore being (at least nominally) the rotation axis of the rotor, and indicated 34.

The spindle passage 17 opens into the spacer member, which is apertured at 33 to admit liquid lubricant at supply pressure to the container from the rotation axis. The spacer member 30 thus forms a radially inner wall for the container.

The centrifugal separator thus far described is essentially conventional, the liquid supplied being both the contaminated lubricant for cleaning within the rotor and drive liquid for effecting rotation of the rotor by its ejection therefrom. It will be understood that in such an assembled structure, there will be a certain degree of end float or axial displacement available to the rotor.

The downwardly acting axial load provided by the weight of the rotor is taken by weight thrust bearing means, indicated generally at 40, and any upward displacement due to any external shocks or accelerations is limited by displacement stop means, indicated at 50, which comprises radially extending flange 51 of bush 32 and a static bush 52 formed by nut 19 secured to the housing part and in use to upper spindle part 161.

In accordance with the present invention, weight thrust bearing means 40 comprises a magnetic repulsion thrust bearing 42. Referring also to FIG. 6(a), the magnetic repulsion thrust bearing 42 comprises two magnetic elements, a stationary magnetic element 43 is mounted in the housing enclosure and fixed with respect thereto surrounding the spindle 16 (and thus axis 34), comprising an annular permanent magnet with axially facing poles 44, 45, and a rotatable magnetic element 46 is mounted in the housing enclosure for rotation with the rotor and comprises an annular permanent magnet with axially facing poles 47, 48 secured to the base 22 of the rotor concentrically with its rotation axis. The magnetic elements are disposed with respect to each other with like poles 45, 47 thereof substantially aligned overlying each other and are of such magnetic strength as to generate sufficient mutual repulsion force to remain not only separated in the axial direction irrespective of the axially downward load placed on the rotor by the weight of lubricant therein in operation and any anticipated external shock forces, but separated by such a gap that materials within the lubricant having ferromagnetic properties and attracted to the magnets, are not trapped between, and risk surface damage to, the magnets.

As the magnetic weight thrust bearing has a magnetic repulsion between the magnetic elements sufficient to lift the rotor against the weight thereof when full of liquid lubricant, the weight of which lubricant per se may be from 80–300% of the weight of the empty rotor, then, notwithstanding any other lifting forces acting on the rotor, the magnetic repulsion thrust bearing will tend to displace the rotor upwardly when it drains of liquid as delivery pressure falls, or if any external forces emulate or loss of weight. Depending upon the permissible extent of axial displacement of the rotor along the spindle, and the rate at which the force of magnetic repulsion decreases with separation of the magnetic elements, axial displacement stop means 50 provides a limit of axial displacement of the rotor by way of abutment between the rotatable and stationary, surfaces 51 and 52 respectively. The surfaces receive lubricant from the journal bush 32 such that they form, at least temporarily, supplementary thrust bearing means.

As discussed above, the journal bearing means comprises spaced bushes which rotate about the spindle and are supported therein by a film of the liquid lubricant. Whilst the hydrodynamic, and to some extent hydrostatic, pressure of this film provides radial stiffness of the journal bearings, when supply pressure falls, it may be insufficient to prevent undamped contact between the rotor-borne bushes and spindle, resulting in audible bearing noise.

It will be appreciated that a magnetic thrust bearing based upon repulsion between axially spaced concentric magnetic elements is inherently unstable radially, as established by Earnshaw's theorem, and the compontent magnets will tend to separate radially. Whereas in a purely magnetic suspension this instability is a problem, in the separator 10 such instability leads to a radial loading on the journal bearings. The additional loading in any direction is relatively small to the well lubricated journals in respect of impending rotation but has the effect of providing a bias that eliminates radial instability of the journals and its consequential tendency to generate vibrations during normal rotation of the liquid filled rotor in operation with full supply pressure and also when the supply pressure falls and the rotor empties during 'wind-down'.

With the magnetic elements nominally concentric with respect to axis 34 the direction in which the radial bias force acts on the journal bushes is indeterminate, and that when the separator is mounted such that the axis 34 is in operation vertical then it is of little consequence in which direction the radial force acts. However, in some designs of centrifugal separators it is necessary for the rotation axis to be permanently inclined to a small extent with respect to the to the vertical and in such circumstances there is throughout operation a directional radial load placed upon the journal bearings. Referring also to FIG. 2, it will be seen that by offsetting the stationary magnetic element in a particular radial direction the repulsion between the magnets can be caused to exert a radial loading on the journal bearings in a predetermined direction opposite to the direction in which the stationary magnetic element is offset from concentricity.

Figure 3:
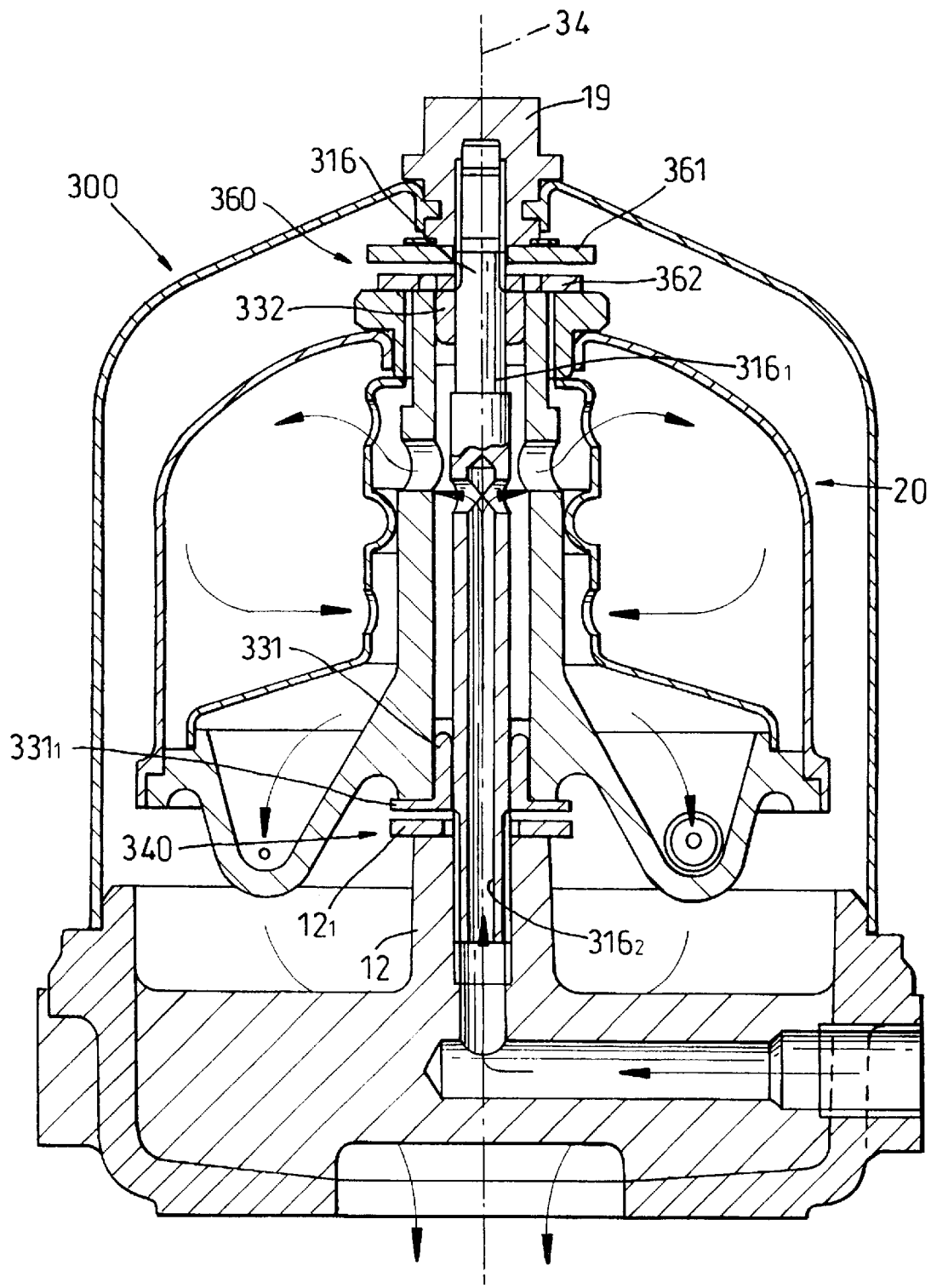
FIG. 3 is a sectional elevation through a second embodiment of self-powered centrifugal separator in accordance with the present invention in which the spindle and journal bearings are dimensioned to effect pressure lift of the rotor in operation and a pressure lift thrust bearing is formed by a magnetic repulsion thrust bearing similar to that of FIG. 1 but mounted above the rotor.

As discussed above in respect of known thrust bearing arrangements, the lubricant supply pressure is sometimes employed with differential end areas of journal bushes to effect such axial lifting of the rotor that a pressure lift thrust bearing is required in normal operation rather than a weight thrust bearing. It will be appreciated that such thrust bearing may be provided by a magnetic repulsion thrust bearing in accordance with the present invention. Referring to FIG. 3 which shows a second embodiment 300 of centrifugal separator, many of the component parts are identical to separator 10 and are given like reference numbers; other components having counterparts which differ in some way have reference numbers distinguished by a leading '3'.

The spindle 316 at its upper part $316_1$, where surrounded by bush 332 has a smaller cross-section than at its lower part $316_2$ where surrounded by bush 331 and/or the bush 332 has a greater wall thickness whereby the difference in areas of the bush ends exposed to the supply liquid pressure results in sufficient force acting on the rotor in an axial upward direction to lift the rotor when filled with the liquid lubricant. The principal thrust bearing means of this embodiment is thus a pressure lift thrust bearing and comprises a magnetic repulsion thrust bearing 360 which is substantially identical to the bearing 42 described above, having a stationary magnetic element 361 in the form of an annular permanent magnet, fixed with respect to the housing on nut 19, and a rotatable magnetic element 362 also in the form of an annular permanent magnet fixed with respect to rotor 20 so that like poles of the magnets face each other.

In a manner analogous to that described above, the strength of the repulsive force is chosen so that the normal pressure-induced lift and anticipated shock forces are insufficient to close the air gap between the magnets to less than is desirable to prevent any metallic particles attracted to either magnet from rubbing against the other.

The lower journal bush 331 is provided with a radially extending flange $331_1$ and the body part 12 supporting the spindle is topped with a corresponding radially extending flange $12_1$ of suitable bearing material, the flange faces being parallel and able to form by way of a lubricant film a hydrodynamic bearing to support the rotating rotor. The flanges $331_1$ and $12_1$ define axial displacement stop means in the form of supplementary thrust bearing means 340.

In both of the above described embodiments 10 and 300 it is intended that the magnetic elements produce between them a magnetic repulsion force which prevents them from coming into contact. Whereas such axially directed magnetic repulsion decreases rapidly as a function of increasing separation between the elements, if the permitted extent of axial travel of the rotor is small then a level of magnetic repulsion that is sufficient to prevent magnet contact in response to additional, external forces, may impose an axial load penalty on an opposing displacement stop means/ supplementary thrust bearing means at certain times within normal operating conditions, for example, the magnetic repulsion of pressure lift thrust bearing 360 adding to the effective weight of the rotor that bears on the supplementary thrust bearing means 340 in the absence of pressure-induced lift. Notwithstanding that the latter is constructed as a conventional lubricated thrust bearing, the level of lubrication in the absence of drive liquid supply pressure may be marginal and unsuited to contending with increased loads at that time. Therefore, it may be pragmatic to provide the elements of the each magnetic repulsion thrust bearing with such magnetic strength as to generate axial repulsive force of such magnitude as to maintain separation between the magnets in response to the relatively static axial loads of normal operation only but not in respect of additional impulsive loads. That is, the magnetic elements may be provided with displacement stop means capable of providing at least a limited thrust bearing function by abutment. This may be provided by coating the adjacent/facing surfaces of the magnetic elements with a suitable material facilitating dry or lubricated contact running, by mounting the magnets around and axially recessed with respect to conventional thrust bearing surfaces, such as $331_1$ and $12_1$ or 51 and 52, formed by the bearing bush and housing, or by embedding in the facing surfaces of the magnets contact making bearing materials which stand proud of the magnet poles, such as shown ghosted at 60 and 61 in FIG. 6(a).

It will be appreciated that either of the centrifugal separator embodiments 10 and 300 may have both main and supplementary thrust bearing means formed totally or in part by magnetic repulsion thrust bearings, particularly the supplementary thrust bearing means 340 of separator 300 which functions as a weight thrust bearing during the wind-down phase of operation. The stationary part 12, or rotatable part $33_1$ may be formed by magnets as described for bearing 42.

As discussed above in relation to the centrifugal separator 10, the magnetic repulsive thrust bearing comprises a weight thrust bearing designed to support the weight of a liquid filled rotor in operation and that as the weight of the liquid is a significant proportion of the total effective weight there will be a strong tendency for the magnetic repulsion force to lift the rotor axially as it empties during wind-down and for which purpose displacement stop means 50 in the form of an upper thrust bearing is desirable.

Figure 4:
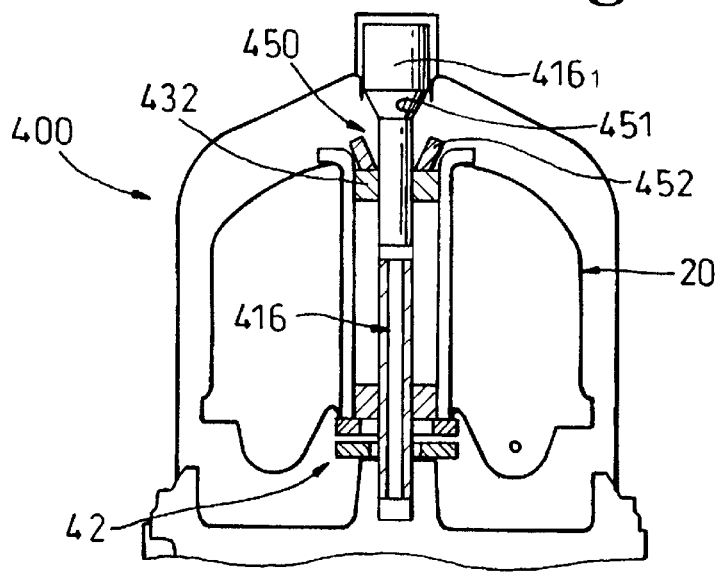
FIG. 4 is a schematic sectional elevation of a third embodiment of centrifugal separator in accordance ,with the present invention, having weight thrust bearing means formed by a magnetic repulsion thrust bearing like FIG. 1 but also with the upper part of the spindle and corresponding journal bush tapered radially and axially to form displacement stop means providing centring and support for a slowing and/or emptying rotor acted upon by the magnetic weight thrust bearing.

Referring to FIG. 4, this shows in very schematic form a third embodiment of centrifugal separator 400, generally similar to separator 10 of FIG. 1 in having a magnetic weight thrust bearing 42 at the lower end of fixed spindle $416_1$ but differing in the respect of axial displacement stop means 450 associated with the upper end $416_2$ of the spindle. The spindle has, adjacent the cylindrical journal bearing surface, a radially and axially tapering portion 451 and the upper bearing bush 432 has a co-operating surface part 452. In normal operation, when the rotor is filled with the liquid lubricant and the combined weight is supported by the magnetic weight thrust bearing 42, there is a gap between the tapered portion 451 of the spindle and the co-operating bush part 452. When lubricant supply pressure falls, the rotor begins to wind-down to rest and at least in part drains of lubricant; the decrease in weight during the wind-down results in the magnetic thrust bearing 42 lifting the rotor such that the tapered portions 451 and 452 come into abutment, the taper serving to centre the rotor and provide not only axial support as axial displacement stop means but also radial support absent the radial stiffness of the journal bearings that was dependent upon the lubricant supply pressure. Such arrangement, which is analogous to that described in the aforementioned GB-A-2308557, is found to achieve a better reduction in vibration and noise during the wind-down period.

Clearly such axial displacement stop means in respect of this axial lift during wind-down could also be disposed proximate the lower journal bearing in a modification of separator 300.

Figure 5:
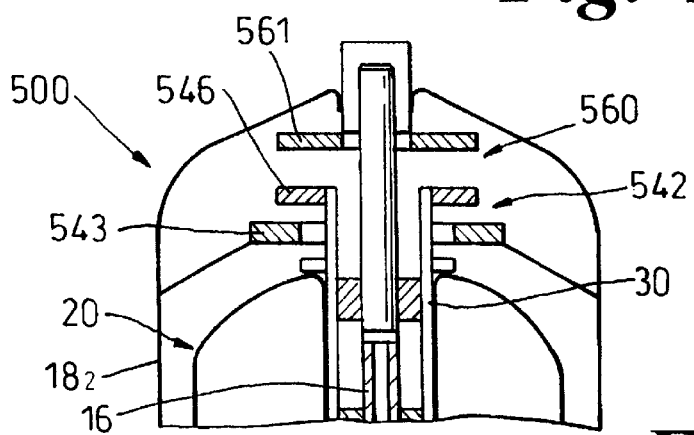
FIG. 5 is a schematic sectional elevation, in the manner of FIG. 3, of part of a fourth embodiment of centrifugal separator in accordance with the invention showing both weight thrust bearing and pressure lift thrust bearing formed by magnetic repulsion thrust bearing each having a magnetic element thereof in common, FIG. 6(*a*) is a partly perspective, partly cross-sectional view of the magnetic repulsion thrust bearing of FIGS. 1 to 5 showing both magnetic elements formed from permanent magnets in the form of simple annular rings each having the axial end face as opposite poles and the rings disposed with like poles facing each other, FIG. 6(*b*) is partly perspective, partly cross-sectional view of an alternative form of magnetic repulsion thrust bearing in which one of the magnetic elements is formed by an annular ring and the other magnetic element is formed by a plurality of discrete, axially-extending bar magnets arrayed around the longitudinal axis, FIG. 6(*c*) is a partly perspective, partly cross-sectional view of a further form of magnetic repulsion thrust bearing, having annular magnetic elements which in an axial direction are U-shaped and each provides radially separated poles facing the other, FIG. 6(*d*) is a partly perspective, partly cross-sectional view of a form of magnetic repulsion thrust bearing having one annular magnetic element similar to that of FIG. 6(*c*) and the other magnetic element formed by a plurality of radially extending bar magnets arrayed around the longitudinal axis, FIGS. 6(*e*) and 6(*f*) are partly perspective, partly cross-sectional views of further forms of magnetic repulsion thrust bearing similar to FIGS. 6(*c*) and 6(*d*) respectively but wherein the stationary magnetic element is formed (at least in part) by an electromagnet.

Although for ease of explanation the magnetic repulsion thrust bearings have hereinbefore been described as disposed in the locations usually occupied by hydrodynamic thrust bearings they replace, this not essential. Referring to FIG. 5, this shows schematically the upper portion only of a fourth embodiment of centrifugal separator 500, having housing part $18_2$, fixed spindle 16 and rotor 20 as described above. The separator 500 differs form the centrifugal separator 10 in that the magnetic repulsion thrust bearing 542 which forms a weight thrust bearing is disposed above the rotor, having an annular ferromagnetic magnet 546 carried by an extension of rotor tubular member 30 and forming a rotatable magnetic element above an annular permanent magnet 543 that is fixed with respect to the bearing and forming a stationary magnetic element.

The Figure also shows the optional provision of a lift thrust bearing 560 formed by a stationary magnetic element 561 and the rotatable magnetic element 546, which is common to both magnetic repulsion thrust bearings. As discussed above, each of the magnetic repulsion thrust bearings may be supplemented by axial displacement stop means that provides a limit of axial displacement by abutment between a stationary and rotatable surface. Such axial displacement stop means may be formed by one or other of the bearings 542 and 560, depending upon which one is providing operational support of the rotor relative to the housing.

In all of the above described embodiments, the axial displacement stop means that functions by abutment between relatively rotating surfaces has been shown in the form of a conventional lubricated or dry-running thrust bearing depending upon the disposition and materials of its parts. It will be appreciated that where such displacement stop means becomes operative only or primarily in circumstances where the spinning rotor is winding down to rest after removal of the lubricant supply pressure, the displacement stop means may have the abutting surfaces arranged to have a shape and/or high level of frictional engagement between them to effect braking of the rotor.

Furthermore, for ease of understanding, all of the above embodiments have been illustrated and described with the magnetic elements of each magnetic repulsion thrust bearing formed by axially spaced, axially polarised, annular permanent magnets as illustrated in FIG. 6(a). It will be appreciated that variations are possible as to the structure of the stationary and rotatable magnetic elements. For example, and although not specifically illustrated, the opposite poles could be defined on the radially inner and outer faces of the magnets rather than the axial ends.

Figure 6B:
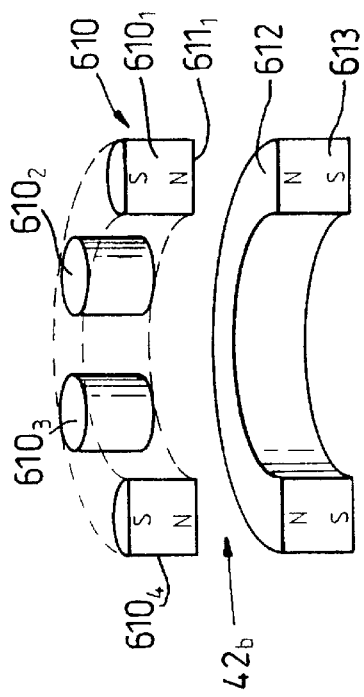
Figure 6D:
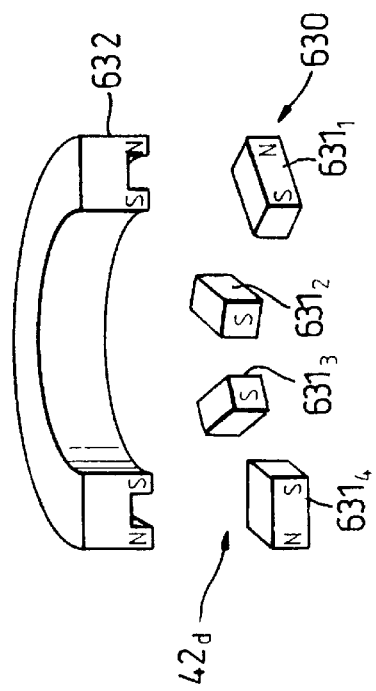
Figure 6A:
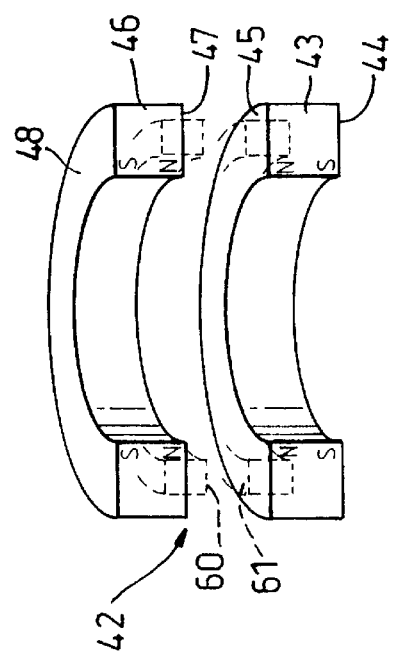

Referring to FIG. 6(b), this shows in similar part perspective, part crosssectional view to that of FIG. 6(a), an alternative arrangement of magnetic repulsion thrust bearing $42_b$ in which one of the magnetic elements, in this case the rotatable element 610, is formed by a plurality of axially extending bar magnets $610_1$, $610_2$, $610_3$ . . . arrayed about the rotation axis and having their poles $611_1$, $611_2$ . . . substantially axially aligned with the annular pole face 612 of the stationary magnetic element 613 which corresponds to element 43. It will be appreciated that provided one of the magnetic elements is of annular form and has a pole completely encircling the axis it does not matter whether it is the stationary or rotatable element.

Figure 6C:
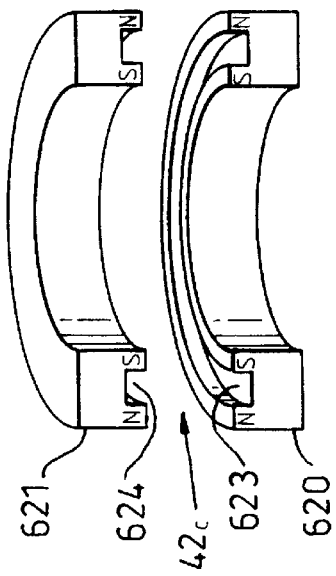

Referring now to FIG. 6(c), the magnetic repulsion thrust bearing $42_c$ has magnetic elements 620 and 621 formed by annular permanent magnets that are U-shaped in crosssection and have their opposite North and South poles at the same axial end of the annulus (facing the other element) and spaced apart radially each side of at least one annular recess 623, 624 respectively.

FIG. 6(d) shows magnetic repulsion thrust bearing $42_d$, being a variant on the above in that one of the magnetic elements, this time the stationary element 630, is provided by a circular array of radially extending bar magnets $631_1$, $631_2$, $631_3$ . . . whose opposite poles are axially aligned with the radially spaced poles of the annular rotatable magnetic element 632 that is U-shaped in cross-section. As a minor variant thereof (not shown), the individual bar magnets may each be U-shaped with the radially separated poles facing corresponding ones of the annular magnet.

Figure 6E:
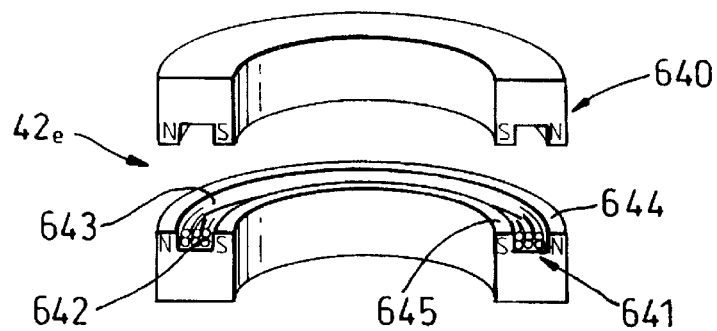
Figure 6F:
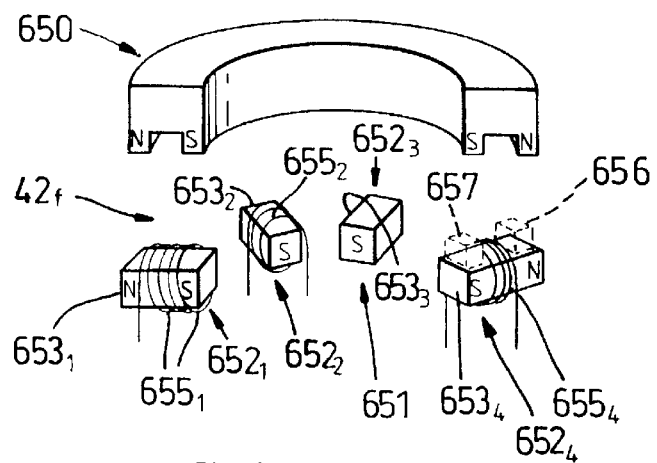

Referring to FIGS. 6(e) and 6(f), these show magnetic repulsion thrust bearings $42_e$ and $42_f$ corresponding to the bearings $42_c$ and $42_d$ respectively of FIGS. 6(c) and 6(d), but wherein the stationary magnetic element is provided to at least in part by an electromagnet. In bearing $42_e$ of FIG. 6(e) the rotatable magnetic element is an annular, permanent magnet 640 of U-shaped cross-section and stationary magnetic element 641 is an annular body of U-shaped cross-section with annular electromagnet coil 642 disposed in recess 643 between the radially spaced poles 644, 645. The body may comprise a ferromagnetic material that is magnetised in accordance with the instantaneous level of direct current flowing in the coil or may comprise a permanent magnet whose magnetic field strength at the poles is varied in accordance with the instantaneous value of current in the coil. In bearing $42_f$ of FIG. 6(f) the rotatable magnetic element is also a permanent magnet 650 of U-shaped cross-section but the stationary magnetic element 651 comprises an array of radially extending bar magnets $652_1$, $652_2$. which may be formed by ferromagnetic or permanent magnet cores $653_1$, $653_2$ . . . around which are wound individual electromagnet coils $655_1$, $655_2$ . . . Alternatively some of the magnets may be permanent magnets and some electromagnets whose full strength is governed by the magnitude of coil current. As a further variant, the cores may be U-shaped in cross-section providing axially extending poles as shown at ghosted 656, 657 on core $653_4$.

It will be appreciated that such a grooved magnetic element, whether a permanent magnet or electromagnet, may have within the groove a ring of bearing material, corresponding to that 60, 61 shown in FIG. 6(a), for the purpose of providing an integral axial displacement stop means.

Figure 7:
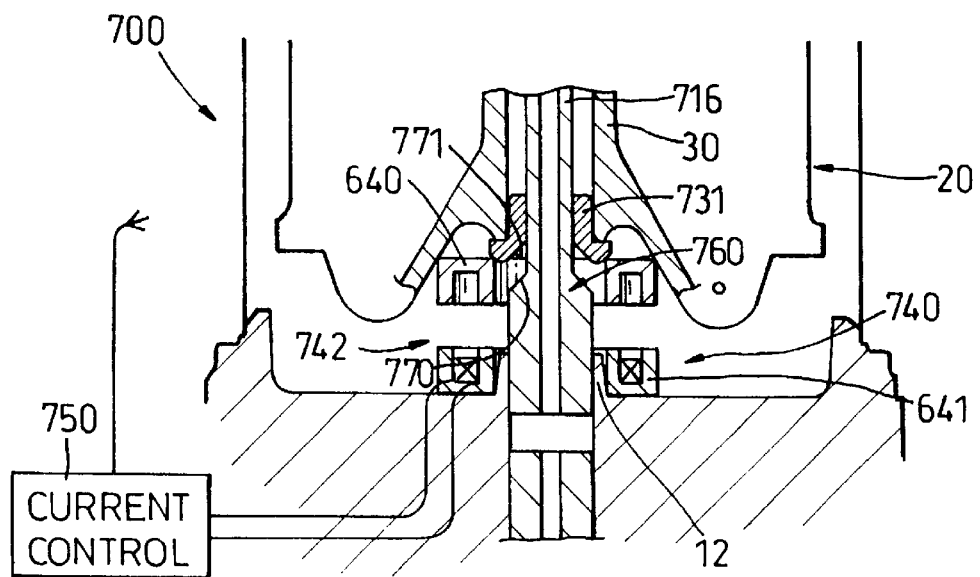
FIG. 7 is a schematic sectional elevation of part of a fifth embodiment of centrifugal separator in accordance with the invention in which the weight thrust bearing is provided in part by the controlled electromagnet repulsion thrust bearing of FIG. 6(a) including control means to control the electromagnet current, and displacement stop means is provided by a tapered spindle and co-operatively tapered journal bush to facilitate centring and physical support of the rotor in the absence of electromagnet current.

Referring now to FIG. 7 this shows schematically a sixth embodiment of centrifugal separator 700 of the general form of FIG. 1, that is, with a weight thrust bearing 740 formed by a magnetic repulsion thrust bearing $42_e$ as shown in FIG. 6(e) wherein rotatable magnetic element comprises an annular permanent magnet 640 that is U-shaped in crosssection and the stationary magnetic element 641 is also U-shaped in cross-section, having radially spaced poles 644 and 645 separated by a recess 643 in which is contained electromagnet coil 642. The coil is supplied with current by control means 750 at a magnitude determined in response to external signals. Although such magnetic thrust bearing $42_e$ may be substituted directly for that 42 in the centrifugal separator 10, the centrifugal separator 700 is shown as having static spindle 716 surrounded by lower journal bearing 731 and below which there is provided axial displacement stop means 760 formed by the spindle increasing in diameter by way of a tapered portion 770 and the journal bearing 731 having a co-operative tapered surface 771. In normal operation the magnetic repulsive force, defined by the coil current from control means 750, supports the rotor 20 at an axial position along the spindle where the tapered surfaces are separated and the rotor is constrained by the journal bearings only, with radial stiffness thereof provided by the hydrodynamic pressure of the film derived from the supplied liquid. When the liquid supply ceases and the rotor begins to wind-down, the absence of radial stiffness in the journal bearing may lead to noise or vibration, and the decreasing weight of the rotor (if it empties of liquid) may lead to it being displaced upwardly by the magnetic thrust bearing. The control means 750, however, responds to signals representative of the cessation of liquid supply per se, supply pressure and/or weight of the rotor, from transducer means (not shown) of any conventional type, to decrease the current in the electromagnet such that the magnetic repulsion force decreases and the rotor is permitted to set down on the tapered portion of the spindle, the co-operating bush centring the rotor to provide both radial and axial support and replace the lost radial stiffness in the absence of supply liquid pressure as described above in relation to the separator 400. The displacement stop means 760 functions in the absence of electromagnetially generated repulsion and as also discussed above, the materials and/or shapes of the co-operating surfaces may effect a dry-running or lubricated bearing which permits free running of the rotor or, for accelerated wind-down of the rotor, a brake.

It will be appreciated that in any of the above described embodiments wherein the stationary element is provided by one or more permanent magnets, instead of choosing the magnet to generate repulsion force of such magnitude as to withstand occasional shock loads without the elements contacting, the magnet may have a lower field strength and a supplementary electromagnet coil and transducer that responds to shock loading directly or to axial displacement of the rotor to vary the repulsion force as required.

In all of the above described embodiments the centrifugal separator has axle means in the form of a static spindle. It will be understood that magnetic repulsion thrust bearing means and, if necessary, axial stop displacement means, may be analogously provided in centrifugal separators in which the axle means comprises a shaft that is fixed with respect to the rotor and rotatable therewith relative to the housing. FIGS. 8(a) to 8(c) show schematic sectional elevations through sixth, seventh and eighth embodiments of centrifugal separators 810, 820 and 830 respectively, all of which have such rotatable shafts 816, 826 and 836 located between separably clampable housing parts $18_1$ and $18_2$ and magnetic repulsion thrust bearings and axial displacement stop means which correspond to FIGS. 1, 4 and 7 respectively. The axial displacement stop means 821 of separator 820 corresponds to the means 450 of separator 400 and the stop means 831 of separator 830 corresponds to the means 760 of the separator 700.

It will be appreciated that in all of the embodiments described with reference to FIGS. 3 to 8(c) the stationary magnetic element may be radially offset from the axis in a particular radial direction to impose a prescribed radial loading on the journal bearings.

It is reiterated that although the invention has been described with reference to embodiments which are all self-powered centrifugal separators, it is equally applicable to a liquid powered centrifugal separator in which the drive liquid is supplied at elevated pressure for the sole purpose of rotating, and if appropriate, lifting the rotor and is supplied separately from the contaminated liquid that is cleaned by the centrifugal forces generated within the rotor, such as described in Patent Specification GB-A-2297499.

It will be appreciated that the magnetic elements may take forms other than particularly described above and may include ferromagnetic materials, or magnetic pole shading materials, possibly being parts of the structural components of the centrifugal separator, to confine or limit magnetic flux paths within the housing or the components of the centrifugal separator.

What is claimed is:

1. A centrifugal separator comprising a housing enclosure, an axis extending through the housing enclosure in an operationally substantially vertical orientation, a rotor rotatable about the axis and apertured to receive and pass therethrough a liquid subjected to rotation with the rotor and centrifugal force to separate out solid contaminants retained in the rotor, at least one sliding journal bearing comprising first cooperating parts fixed one each to the rotor and housing and separated by a clearance gap filled with lubricant in operational rotation, for facilitating said rotation of the rotor about the axis, and at least one magnetic repulsion thrust bearing comprising second cooperating parts fixed one each to the rotor and housing and operable both to exert an axial supporting force on the rotor by magnetic repulsion between two magnetic elements thereof and to exert a radial bias force on said at least one journal bearing in one radial direction effecting radial loading between said second cooperating parts in said radial direction.

2. A centrifugal separator as claimed in claim 1 wherein one of said two magnetic elements comprises a stationary magnetic element, mounted in the housing enclosure and fixed with respect thereto, and the other of said two magnetic elements comprises a rotatable magnetic element, mounted in the housing enclosure for rotation with the rotor, said two magnetic elements extending circumferentially around the axis, the rotatable magnetic element comprising a permanent magnet means and at least one of said stationary and rotatable magnets having at least one circumferentially continuous magnetic pole.

3. A centrifugal separator as claimed in claim 2 in which each of the magnetic elements has axially spaced magnetic poles of opposite polarity, one pole of each being disposed axially proximate a like pole of the other element.

4. A centrifugal separator as claimed in claim 2 in which each of the magnetic elements has radially spaced magnetic poles of opposite polarity and disposed axially proximate like poles of the other element.

5. A centrifugal separator as claimed in claim 4 in which the magnetic element has radially displaced magnetic poles of opposite polarity separated by a radially and circumferentially extending recess.

6. A centrifugal separator as claimed in claim 5 in which the stationary magnet is at least in part formed by electromagnet means including electromagnet coil means and control means operable to supply current thereto, and said electromagnet coil means is located within said recess.

7. A centrifugal separator as claimed in claim 2 in which at least one of said rotatable and stationary magnetic elements comprises a plurality of circumferentially discrete component magnets arrayed about the axis.

8. A centrifugal separator as claimed in claim 2 in which the stationary magnetic element is annular and both magnetic poles are circumferentially continuous.

9. A centrifugal separator as claimed in claim 2 in which the stationary magnet is a permanent magnet.

10. A centrifugal separator as claimed in claim 2 in which the stationary magnet is at least in part formed by electromagnet means including electromagnet coil means and control means operable to supply current thereto.

11. A centrifugal separator as claimed in claim 10 in which the control means is operable to vary the magnetic field strength of the stationary magnetic element.

12. A centrifugal separator as claimed in claim 1 including axial stop displacement means operable to provide a rotor displacement limitation in opposition to axial displacement resulting from magnetic repulsion within the magnetic repulsion thrust bearing means.

13. A centrifugal separator as claimed in claim 12 in which the axial stop displacement means comprises brake means operable to inhibit rotation of the rotor about the axis.

14. A centrifugal separator as claimed in claim 13 in which the axial stop displacement means comprises supplementary thrust bearing means operable to permit free running between the rotor and housing.

15. A centrifugal separator as claimed in claim 12 in which the axial stop displacement means comprises supplementary thrust bearing means operable to permit free running between the rotor and housing.

16. A centrifugal separator as claimed in claim 15 in which the supplementary thrust bearing means comprises a supplementary magnetic repulsion thrust bearing.

17. A centrifugal separator as claimed in claim 1 including by axial stop displacement means operable to provide a rotor displacement limitation in response to displacement against said magnetic repulsion within the magnetic repulsion thrust bearing means.

18. The centrifugal separator as claimed in claim 1 including axial stop displacement means operable to provide a rotor displacement limitation in opposition to axial displacement resulting from magnetic repulsion within the magnetic repulsion thrust bearing, said axial stop displacement means including a stationary surface, fixed with respect to the housing enclosure, and a rotatable surface rotatable with the rotor and operable to bear on the stationary surface, and further wherein said stationary surface and said rotatable surface each taper radially and axially, whereby the axial stop displacement means is operable to support the rotor axially and radially in response to a predetermined axial displacement of the rotor.

19. The centrifugal separator as claimed in claim 18 in which one of said two magnetic elements comprises a stationary magnetic element at least in part formed by electromagnet means including electromagnet coil means and control means operable to supply current thereto and wherein said stationary surface and said rotatable surface are disposed such that the rotor is supported thereby in response to a predetermined reduction in magnetic repulsion force exerted by the stationary magnetic element.

20. A centrifugal separator comprising a housing enclosure, an axis extending through the housing enclosure in an operationally substantially vertical orientation, a rotor arranged to receive a liquid at elevated pressure and rotable about the axis in reaction to ejection of the liquid therefrom substantially tangentially, journal bearing means for facilitating said rotation of the rotor about the axis and thrust bearing means for supporting the weight of the rotor in respect of displacement along the direction of the axis: said thrust bearing means comprising at least one magnetic repulsion thrust bearing operable to support by magnetic repulsion between two magnetic elements thereof at least part of the load created by the operatively rotating rotor in a direction along the axis; said centrifugal separator including axial stop displacement means operable to provide a rotor displacement limitation in opposition to axial displacement resulting from magnetic repulsion with the magnetic repulsion thrust bearing means; the axial stop displacement means comprising brake means operable to inhibit rotation of the rotor about the axis, a stationary surface fixed with respect to the housing enclosure, and a rotable surface, rotable with the rotor and operable to bear on the stationary surface; and wherein said stationary surface and said rotable surface each taper radially and axially, whereby the stop means is operable to support the rotor axially and radially in response to a predetermined axial displacement of the rotor.

21. A centrifugal separator claimed in claim 20 in which one of said two magnetic elements comprises a stationary magnetic element at least in part formed by electromagnet means including electromagnet coil means and control means operable to supply current thereto and wherein said stationary surface and said rotatable surface are disposed such that the rotor is supported thereby in response to a predetermined reduction in magnetic repulsion force exerted by the stationary magnetic element.

22. A rotor for use with a centrifugal separator having a vertical axis, a journal bearing operable to support a rotor for rotation about the vertical axis and a thrust bearing for supporting the weight of the rotor in respect of displacement along a direction of the axis, said thrust bearing including a magnetic repulsion thrust bearing operable to support at least part of the load created in use by an operatively rotating rotor by magnetic repulsion between two magnetic elements, said rotor comprising a magnet support surface at a bottom end thereof which in use is axially supported by an upwardly facing end of a magnet of the magnetic repulsion thrust bearing; and wherein said rotor includes recesses with a pair of tangentially directed jet reaction nozzles, and further wherein said magnet support surface is disposed above and radially inward of bottom portions of said recesses.

23. A rotor according to claim 22, wherein said rotor includes an axial central bore, and wherein said magnet support surface extends radially from a bottom end of said central bore.

24. A rotor for use with a centrifugal separator having a vertical axis, a journal bearing operable to support a rotor for rotation about the vertical axis and a thrust bearing for supporting the weight of the rotor in respect of displacement along a direction of the axis, said thrust bearing including a magnetic repulsion thrust bearing operable to support at least part of the load created in use by an operatively rotating rotor by magnetic repulsion between two magnetic elements, said rotor comprising a magnet support surface at a bottom end thereof which in use is axially supported by an upwardly facing end of a magnet of the magnetic repulsion thrust bearing; and wherein said rotor includes an axial central bore, and further wherein said magnet support surface extends radially from a bottom end of said axial central bore.

25. A rotor according to claim 24 wherein the rotor includes a hollow tubular member that defines said axial central bore, said hollow tubular member being apertured to permit a liquid to pass therethrough.

\* \* \* \* \*

UNITED STATES PATENT AND TRADEMARK OFFICE
CERTIFICATE OF CORRECTION

PATENT NO.    : 6,424,067 B1
DATED         : July 23, 2002
INVENTOR(S)   : Samways It is certified that error appears in the above-identified patent and that said Letters Patent is hereby corrected as shown below:

<u>Title page,</u>
Item [73], Assignee, delete "Federal-Mogul Engineering Limited (GB)" and insert
-- Filterwerk Mann + Hummel GmbH (GB). --

Signed and Sealed this

Twenty-sixth Day of November, 2002

*Attest:*

JAMES E. ROGAN
*Attesting Officer*    *Director of the United States Patent and Trademark Office*